United States Patent
Oram et al.

(10) Patent No.: US 11,286,203 B2
(45) Date of Patent: Mar. 29, 2022

(54) ULTRA-THIN, NON-FRANGIBLE GLASS AND METHODS OF MAKING

(71) Applicant: Corning Incorporated, Corning, NY (US)

(72) Inventors: Pascale Oram, Hammondsport, NY (US); Rostislav Vatchev Roussev, Painted Post, NY (US); Vitor Marino Schneider, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 460 days.

(21) Appl. No.: 15/403,817

(22) Filed: Jan. 11, 2017

(65) Prior Publication Data
US 2017/0197876 A1    Jul. 13, 2017

Related U.S. Application Data

(60) Provisional application No. 62/278,125, filed on Jan. 13, 2016.

(51) Int. Cl.
| | | |
|---|---|---|
| *C03C 21/00* | (2006.01) | |
| *C03C 3/097* | (2006.01) | |
| *C03C 4/18* | (2006.01) | |
| *H05K 5/00* | (2006.01) | |

(52) U.S. Cl.
CPC .......... *C03C 21/002* (2013.01); *C03C 3/097* (2013.01); *C03C 4/18* (2013.01); *H05K 5/0017* (2013.01); *C03C 2204/00* (2013.01)

(58) Field of Classification Search
CPC ....... C03C 21/002; C03C 3/091; C03C 3/097; C03C 3/083; C03C 3/085; C03C 3/087; C03C 2204/00; C03C 3/093; C03C 3/095; C03C 4/18091; C03C 4/18; C03C 10/0054
See application file for complete search history.

(56) References Cited

U.S. PATENT DOCUMENTS

| | | | |
|---|---|---|---|
| 8,756,262 B2* | 6/2014 | Zhang | G06F 16/2462 708/200 |
| 8,765,262 B2* | 7/2014 | Gross | C03C 3/093 428/410 |
| 9,140,543 B1 | 9/2015 | Allan et al. | |
| 9,156,724 B2* | 10/2015 | Gross | C03C 3/085 |
| 9,346,703 B2* | 5/2016 | Bookbinder | C03C 3/062 |

(Continued)

FOREIGN PATENT DOCUMENTS

| | | |
|---|---|---|
| CN | 102137822 A | 7/2011 |
| CN | 104114503 A | 10/2014 |

(Continued)

OTHER PUBLICATIONS

International Search Report and Written Opinion PCT/US2017/012952 dated Apr. 25, 2017.

(Continued)

*Primary Examiner* — Jodi C Franklin
(74) *Attorney, Agent, or Firm* — Kevin M. Johnson

(57) ABSTRACT

Glasses having a thickness t in a range from about 0.1 mm to less than 0.4 mm which, when chemically strengthened, is non-frangible and has a physical center tension CT (also referred to herein as "physical CT"), wherein $CT > |-1.956 \times 10^{-16} \times t^6 + 1.24274 \times 10^{-12} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994|$, where t is expressed in microns.

28 Claims, 10 Drawing Sheets

(56) References Cited

U.S. PATENT DOCUMENTS

| | | | |
|---|---|---|---|
| 9,499,431 B2 | 11/2016 | Barefoot et al. | |
| 2010/0009154 A1* | 1/2010 | Allan | C03C 3/085 428/220 |
| 2010/0047521 A1* | 2/2010 | Amin | C03C 3/087 428/141 |
| 2011/0294649 A1* | 12/2011 | Gomez | C03C 3/097 501/66 |
| 2011/0312483 A1* | 12/2011 | Nakashima | C03C 21/002 501/70 |
| 2012/0135226 A1* | 5/2012 | Bookbinder | C03C 3/064 428/335 |
| 2013/0004758 A1* | 1/2013 | Dejneka | C03C 3/087 428/220 |
| 2013/0045375 A1* | 2/2013 | Gross | C03C 3/091 428/220 |
| 2013/0129947 A1* | 5/2013 | Harvey | C03B 33/091 428/34.4 |
| 2014/0109616 A1* | 4/2014 | Varshneya | C03C 21/00 65/30.14 |
| 2014/0186632 A1* | 7/2014 | Dejneka | C03C 21/002 428/410 |
| 2014/0334006 A1* | 11/2014 | Adib | G02B 1/10 359/580 |
| 2014/0345325 A1* | 11/2014 | Allan | C03C 21/002 65/30.14 |
| 2014/0356576 A1* | 12/2014 | Dejneka | C03C 3/093 428/141 |
| 2014/0370303 A1* | 12/2014 | Jin | C03C 21/005 428/426 |
| 2015/0030834 A1 | 1/2015 | Morey et al. | |
| 2015/0064474 A1* | 3/2015 | Dejneka | C03C 4/005 428/410 |
| 2015/0140325 A1* | 5/2015 | Gross | C03C 3/087 428/336 |
| 2015/0239775 A1* | 8/2015 | Amin | C03C 3/091 428/220 |
| 2015/0239776 A1* | 8/2015 | Amin | C03C 3/091 428/220 |
| 2015/0274581 A1* | 10/2015 | Beall | C03C 3/097 501/4 |
| 2015/0284288 A1* | 10/2015 | Ellison | C03C 21/002 501/32 |
| 2015/0368135 A1* | 12/2015 | Muenzer | A61L 2/22 210/149 |
| 2015/0368148 A1* | 12/2015 | Duffy | C03C 3/095 428/220 |
| 2015/0368153 A1* | 12/2015 | Pesansky | C03C 3/097 428/220 |
| 2016/0122239 A1* | 5/2016 | Amin | C03C 21/002 428/220 |
| 2016/0122240 A1* | 5/2016 | Oram | C03C 21/002 428/220 |
| 2016/0356760 A1* | 12/2016 | Roussev | C03C 21/002 |
| 2017/0362116 A1* | 12/2017 | Lambright | C03C 3/087 |
| 2018/0312430 A1* | 11/2018 | Lambright | C03C 21/002 |

FOREIGN PATENT DOCUMENTS

| | | |
|---|---|---|
| CN | 104379522 A | 2/2015 |
| CN | 104870393 A | 8/2015 |
| JP | 2015-500194 A | 1/2015 |
| JP | 2016-000682 A | 1/2016 |
| WO | 2013/074779 A1 | 5/2013 |
| WO | 2013/184205 A1 | 12/2013 |
| WO | 2015/080043 A1 | 6/2015 |
| WO | 2016/073539 A1 | 5/2016 |

OTHER PUBLICATIONS

Chinese Patent Application No. 201780006798.2, Office Action dated Dec. 3, 2020, 25 pages (English Translation Only); Chinese Patent Office.

Japanese Patent Application No. 2018-536449, Office Action dated Nov. 9, 2020, 15 pages (7 pages of English Translation and 8 pages of Original Document); Japanese Patent Office.

English Translation of TW106101173 Office Action dated Jul. 31, 2020; 2 Pages; Taiwan Paten Office.

Japanese Patent Application No. 2018-536449, Office Action dated Sep. 14, 2021, 10 pages (5 pages of English Translation and 5 pages of Original Document), Japanese Patent Office.

Maruyama et al., "Shock-Resistant Destructive Characteristic of Sheet Glass Based on the ISO Method", Kyoto University Accident Prevention Research Institute Annual-Report, and No. 54 B, Kyoto University, Jun. 2011, 7 pages.

Nippon Sheet Glass Company Limited: Glass Construction Material General Catalog, Nippon Sheet Glass Company, Limited, 2015, 5 pages.

* cited by examiner

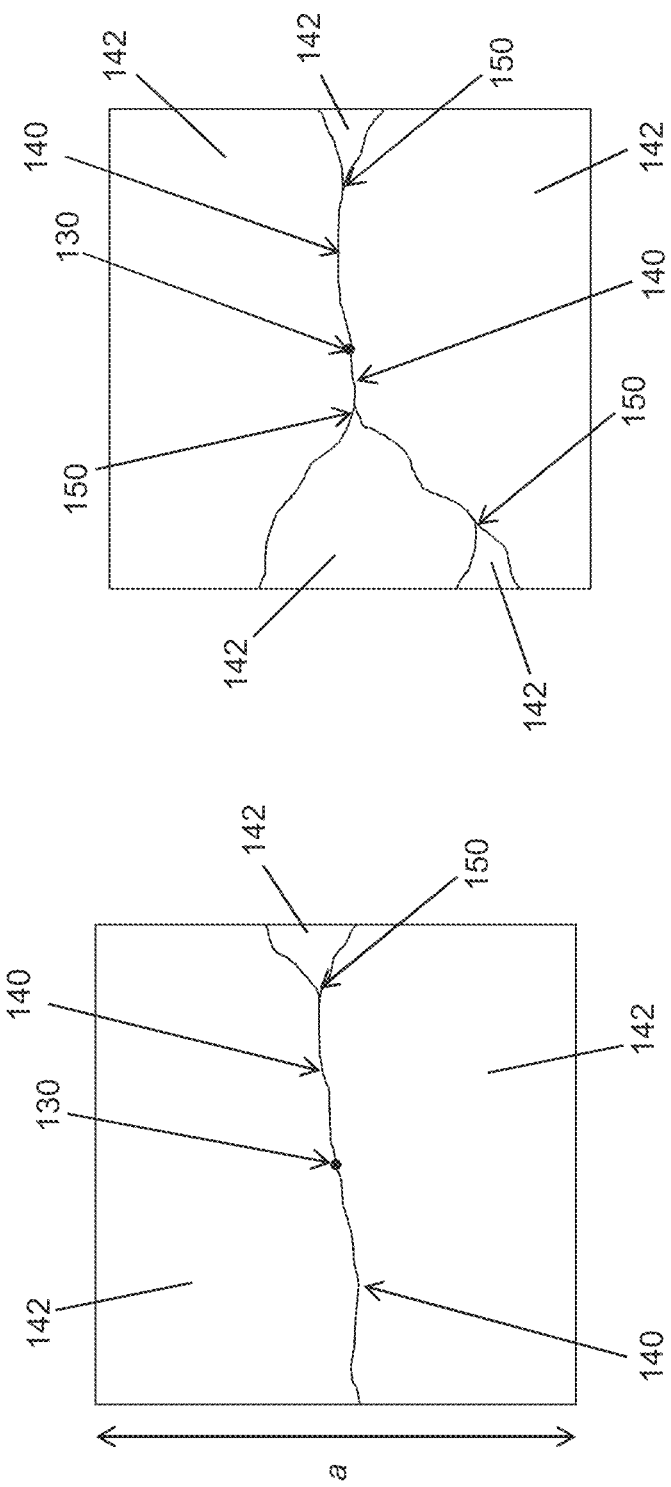

ULTRA-THIN, NON-FRANGIBLE GLASS AND METHODS OF MAKING

CROSS-REFERENCE TO RELATED APPLICATIONS

This application claims the benefit of priority under 35 U.S.C. § 119 of U.S. Provisional Application Ser. No. 62/278,125, filed Jan. 13, 2016, the contents of which are relied upon and incorporated herein by reference in their entirety.

BACKGROUND

The disclosure relates to an ion exchangeable glass. More particularly, the disclosure relates to an ion exchangeable glass having a thickness of less than 0.4 mm. Even more particularly, the disclosure relates to a glass which, when ion exchanged, is non-frangible.

In an ion exchange process diffusion of the larger cations (e.g., K+) into a glass is guided by a classical complementary error function. The shape and value of the stress profile resulting from ion exchange was previously determined by the physical center tension limit, which is the tensile stress or physical center tension value above which undesirable behavior, such as frangibility, was expected to occur when the glass suffered an impact or insult.

SUMMARY

The present disclosure provides glasses having a thickness t in a range from about 0.1 mm to less than 0.4 mm which, when chemically strengthened, is non-frangible and has a physical center tension CT (also referred to herein as "physical CT") that exceeds a frangibility limit; i.e., $CT > |-1.956 \times 10^{-16} \times t^6 + 1.24274 \times 10^{-12} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994|$, where t is expressed in microns.

Accordingly, one aspect of the disclosure is to provide a glass article having a thickness t, wherein 0.1 mm≤t<0.4 mm, a compressive layer extending from a surface of the glass article to a depth of compression DOC and a tensile region extending from the depth of compression to a center region of the glass article. The tensile region under a physical center tension CT, wherein $CT > |-1.956 \times 10^{16} \times t^6$ $1.24274 \times 10^{42} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994|$, where t is expressed in microns, and wherein the glass is non-frangible.

Another aspect of the disclosure is to provide a glass article having a thickness t, wherein 0.1 mm≤t<0.4 mm, and comprising: a compressive layer extending from a surface of the glass article to a depth of compression DOC and a tensile region extending from the depth of compression to a center region of the glass article, the tensile region under a physical center tension CT, wherein $CT > |-1.956 \times 10^{-6} \times t^6 + 1.24274 \times 10^{-12} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994|$, where t is expressed in microns. The compressive layer has a stress profile comprising: a first region extending from at least a first depth D1 to the depth of compression DOC, wherein at least a portion of the first region is linear and has a slope m1, wherein 20 MPa/μm≥|m1|≥1.2 MPa/μm and where 9 μm≤D1≤17 μm; and a second region extending from the surface to a depth of up to the first depth D1, the second region having a linear portion extending from the surface to a depth of up to about 5 μm or less and having a slope m2, wherein 200 MPa/μm≥|m2|≥30 MPa/μm; and wherein the glass article is non-frangible.

Another aspect of the disclosure is to provide a method of ion exchanging a glass article having a thickness t, wherein 0.1 mm≤t<0.4 mm. The method comprises: ion exchanging the glass article in a first ion exchange bath at a temperature in a range from about 300° C. to about 500° C., the first ion exchange bath comprising from about 25% to about 100% $KNO_3$ by weight and up to about 75% $NaNO_3$ by weight; forming a compressive stress layer, the compressive stress layer extending from a surface of the glass article to a depth of compression DOC, wherein 0.05 t≤DOC≤0.22 t; and forming a tensile region in a center portion of the glass article, the tensile region extending from the depth of compression DOC to a center region of the glass article, the tensile region having a physical center tension CT, wherein $CT > |-1.956 \times 10^{-16} \times t^6 + 1.24274 \times 10^{-12} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994|$, where t is expressed in microns, and wherein the glass is non-frangible.

According to aspect 1 of the disclosure a glass article is provided. The glass article has a thickness t, wherein 0.1 mm≤t<0.4 mm, a compressive layer extending from a surface of the glass article to a depth of compression DOC and a tensile region extending from the depth of compression to a center region of the glass article, the tensile region is under a physical center tension CT, wherein $CT > |-1.956 \times 10^{-16} \times t^6 + 1.24274 \times 10^{-12} \times t^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994|$, where t is expressed in microns.

According to aspect 2 of the disclosure, the glass article of aspect 1 is provided wherein 0.05 t≤DOC≤0.22 t.

According to aspect 3 of the disclosure, the glass article of aspects 1 or 2 is provided wherein the compressive layer has a compressive stress CS1 at the surface, and wherein 200 MPa≤CS1≤950 MPa.

According to aspect 4 of the disclosure, the glass article of any of aspects 1 to 3 is provided wherein the glass article is ion exchanged.

According to aspect 5 of the disclosure, the glass article of any of aspects 1 to 4 is provided wherein the compressive layer has a stress profile, wherein at least a portion of the stress profile is linear and has a slope m1, and wherein 200 MPa/μm≥|m1|≥1 MPa/μm.

According to aspect 6 of the disclosure, the glass article of aspect 5 is provided wherein 20 MPa/μm≥|m1|≥1.2 MPa/μm.

According to aspect 7 of the disclosure, the glass article of aspect 6 is provided wherein 1.5 MPa/μm≤|m1|≤15 MPa/μm.

According to aspect 8 of the disclosure, the glass article of aspect 6 is provided wherein the stress profile further comprises a second region extending from the surface to a depth up to a depth D1, where 9 μm≤D1≤17 μm, the second region having a linear portion extending from the surface to a depth of up to about 5 μm and having a slope m2, wherein 200 MPa/μm≥|m2|≥30 MPa/μm.

According to aspect 9 of the disclosure, the glass article of aspect 8 is provided wherein 160 MPa/μm≥|m2|≥40 MPa/μm.

According to aspect 10 of the disclosure, the glass article of aspect 9 is provided wherein 120 MPa/μm≥|m2|≥45 MPa/μm.

According to aspect 11 of the disclosure, the glass article of any of aspects 1 to 10 is provided wherein the glass article comprises an alkali aluminosilicate glass.

According to aspect 12 of the disclosure, the glass article of aspect 11 is provided wherein the alkali aluminosilicate glass comprises up to about 10 mol % $Li_2O$.

According to aspect 13 of the disclosure, the glass article of aspect 11 is provided wherein the alkali aluminosilicate glass is lithium-free.

According to aspect 14 of the disclosure, the glass article of aspect 11 is provided wherein the alkali aluminosilicate glass comprises at least about 4 mol % $P_2O_5$ and from 0 mol % to about 5 mol % $B_2O_3$, wherein $1.3<[(P_2O_5+R_2O)/M_2O_3]\leq2.3$, where $M_2O_3=Al_2O_3+B_2O_3$, and $R_2O$ is the sum of monovalent cation oxides present in the alkali aluminosilicate glass.

According to aspect 15 of the disclosure, the glass article of aspect 14 is provided wherein 11 mol %$\leq M_2O_3 \leq$30 mol %.

According to aspect 16 of the disclosure, the glass article of aspect 14 is provided wherein the alkali aluminosilicate glass comprises from about 40 mol % to about 70 mol % $SiO_2$; from about 11 mol % to about 25 mol % $Al_2O_3$; from 0 mol % to about 5 mol % $B_2O_3$; from about 4 mol % to about 15 mol % $P_2O_5$; from about 13 mol % to about 25 mol % $Na_2O$; and from 0 mol % to about 1 mol % $K_2O$.

According to aspect 17 of the disclosure, the glass article of aspect 14 is provided wherein $R_xO$ is the sum of alkali metal oxides, alkaline earth metal oxides, and transition metal monoxides present in the glass, and wherein 13 mol %$\leq R_xO \leq$30 mol %.

According to aspect 18 of the disclosure, the glass article of any of aspects 1 to 16 is provided wherein the physical center tension CT is less than or equal to about 200 MPa.

According to aspect 19 of the disclosure, the glass article of aspect 18 is provided wherein the center tension CT is less than or equal to about 135 MPa.

According to aspect 20 of the disclosure, the glass article of aspect 19 is provided wherein the center tension CT is less than or equal to about 98 MPa.

According to aspect 21 of the disclosure, the glass article of any of aspects 1 to 20 is provided wherein DOC>0.15 t, wherein CT (MPa)$\leq(85/\sqrt{t}$ (mm)).

According to aspect 22 of the disclosure, the glass article of aspect 21 is provided wherein 0.18 t<DOC<0.22 t, wherein CT (MPa)$\leq(79/\sqrt{t}$ (mm)).

According to aspect 23 of the disclosure, the glass article of aspect 22 is provided wherein 0.16 t<DOC<0.19 t, wherein CT (MPa)$\leq(73/\sqrt{t}$ (mm)).

According to aspect 24 of the disclosure, the glass article of any of aspects 1 to 23 is provided wherein the glass article is non-frangible.

According to aspect 25 of the disclosure a consumer electronic product is provided. The consumer electronic product comprises: a housing having a front surface, a back surface and side surfaces; electrical components provided at least partially within the housing, the electrical components including at least a controller, a memory, and a display, the display being provided at or adjacent the front surface of the housing; and the glass article of any of aspects 1 to 24 disposed over the display.

According to aspect 26 of the disclosure a glass article is provided. The glass article has a thickness t, wherein 0.1 mm$\leq$t<0.4 mm, and comprises: a compressive layer extending from a surface of the glass article to a depth of compression DOC, the compressive layer having a stress profile. The stress profile comprises: a first region extending from at least a first depth D1 to the depth of compression DOC, wherein at least a portion of the first region is linear and has a slope m1, wherein 20 MPa/μm$\geq$|m1|$\geq$1.2 MPa/μm and where 9 μm$\leq$D1$\leq$17 μm; and a second region extending from the surface to a depth of up to the first depth D1, the second region having a linear portion extending from the surface to a depth of up to about 5 μm or less and having a slope m2, wherein 200 MPa/μm$\geq$|m2|$\geq$30 MPa/μm; and a tensile region extending from the depth of compression to a center region of the glass article, the tensile region under a physical center tension CT, wherein CT>|$-1.956\times10^{-16}\times t^6 + 1.24274\times10^{-12}\times t^5 - 3.09196\times10^{-9}\times t^4 + 3.80391\times10^{-6}\times t^3 - 2.35207\times10^{-3}\times t^2 + 5.96241\times10^{-1}\times t + 36.5994$|, where t is expressed in microns.

According to aspect 27 of the disclosure, the glass article of aspect 26 is provided wherein 0.08 t$\leq$DOC$\leq$0.22 t.

According to aspect 28 of the disclosure, the glass article of aspect 27 is provided wherein 0.1 t$\leq$DOC$\leq$0.20 t.

According to aspect 29 of the disclosure, the glass article of any of aspects 26 to 28 is provided wherein the compressive layer has a compressive stress CS at the surface, and wherein 200 MPa$\leq$CS$\leq$950 MPa.

According to aspect 30 of the disclosure, the glass article of any of aspects 26 to 29 is provided wherein the glass article is ion exchanged.

According to aspect 31 of the disclosure, the glass article of any of aspects 26 to 30 is provided wherein the glass article comprises an alkali aluminosilicate glass.

According to aspect 32 of the disclosure, the glass article of aspect 31 is provided wherein the alkali aluminosilicate glass comprises up to about 10 mol % $Li_2O$.

According to aspect 33 of the disclosure, the glass article of aspect 31 is provided wherein the glass is lithium-free.

According to aspect 34 of the disclosure, the glass article of aspect 31 is provided wherein the alkali aluminosilicate glass comprises at least about 4 mol % $P_2O_5$ and from 0 mol % to about 5 mol % $B_2O_3$, wherein $1.3<[(P_2O_5+R_2O)/M_2O_3]\leq2.3$, where $M_2O_3=Al_2O_3+B_2O_3$, and $R_2O$ is the sum of monovalent cation oxides present in the alkali aluminosilicate glass.

According to aspect 35 of the disclosure, the glass article of aspect 31 is provided wherein the glass comprises from about 40 mol % to about 70 mol % $SiO_2$; from about 11 mol % to about 25 mol % $Al_2O_3$; from 0 mol % to about 5 mol % $B_2O_3$; from about 4 mol % to about 15 mol % $P_2O_5$; from about 13 mol % to about 25 mol % $Na_2O$; and from 0 mol % to about 1 mol % $K_2O$.

According to aspect 36 of the disclosure, the glass article of aspect 31 is provided wherein 11 mol %$\leq M_2O_3 \leq$30 mol %.

According to aspect 37 of the disclosure, the glass article of aspect 31 is provided wherein $R_xO$ is the sum of alkali metal oxides, alkaline earth metal oxides, and transition metal monoxides present in the glass, and wherein 13 mol %$\leq R_xO \leq$30 mol %.

According to aspect 38 of the disclosure, the glass article of any of aspects 26 to 37 is provided wherein the center tension CT is less than or equal to about 200 MPa.

According to aspect 39 of the disclosure, the glass article of any of aspects 26 to 38 is provided wherein the center tension CT is less than or equal to about 135 MPa According to aspect 40 of the disclosure, the glass article of any of aspects 26 to 39 is provided wherein the center tension CT is less than or equal to about 98 MPa.

According to aspect 41 of the disclosure, the glass article of any of aspects 26 to 40 is provided wherein DOC>0.15 t, wherein CT (MPa)$\leq(85/\sqrt{t}$ (mm)).

According to aspect 42 of the disclosure, the glass article of aspect 41 is provided wherein 0.18 t<DOC<0.22 t, wherein CT (MPa)$\leq(79/\sqrt{t}$ (mm)).

According to aspect 43 of the disclosure, the glass article of aspect 42 is provided wherein 0.16 t<DOC<0.19 t, wherein CT (MPa)≤(73/√t (mm)).

According to aspect 44 of the disclosure, the glass article of any of aspects 26 to 43 is provided wherein the glass article is non-frangible.

According to aspect 45 of the disclosure a consumer electronic product is provided. The consumer electronic product comprises: a housing having a front surface, a back surface and side surfaces; electrical components provided at least partially within the housing, the electrical components including at least a controller, a memory, and a display, the display being provided at or adjacent the front surface of the housing; and the glass article of any of aspects 26 to 44 disposed over the display.

According to aspect 46 of the disclosure a method of ion exchanging a glass article having a thickness t, wherein 0.1 mm≤t<0.4 mm is provided. The method comprises: ion exchanging the glass article in a first ion exchange bath at a temperature in a range from about 300° C. to about 500° C., the first ion exchange bath comprising from about 25% to about 100% $KNO_3$ by weight and up to about 75% $NaNO_3$ by weight; forming a compressive stress layer, the compressive stress layer extending from a surface of the glass article to a depth of compression DOC, wherein 0.05 t≤DOC≤0.22 t; and forming a tensile region in a center portion of the glass article, the tensile region extending from the depth of compression DOC to a center region of the glass article, the tensile region having a physical center tension CT, wherein CT>|−1.956×10$^{-16}$×t$^6$+1.24274×10$^{-12}$×t$^5$−3.09196×10$^{-9}$×t$^4$+3.80391×10$^{-6}$×t$^3$−2.35207×10$^{-3}$×t$^2$+5.96241×10$^1$×t+36.5994|, where t is expressed in microns.

According to aspect 47 of the disclosure, the method of aspect 46 is provided wherein forming the compressive layer comprises forming a stress profile, wherein at least a portion of the stress profile is linear and has a slope m1, and wherein 200 MPa/μm≥|m1|≥1 MPa/μm.

According to aspect 48 of the disclosure, the method of aspect 46 is provided wherein 20 MPa/μm≥|m1|≥1.2 MPa/μm.

According to aspect 49 of the disclosure, the method of aspect 46 is provided wherein 15 MPa/μm≥|m1|≥1.5 MPa/μm.

According to aspect 50 of the disclosure, the method of any of aspects 46 to 49 is provided further comprising: ion exchanging the glass article in a second ion exchange bath after ion exchanging the glass article in the first ion exchange bath, the second ion exchange bath comprising: and forming a second region of the stress profile, the second region extending from the surface to a first depth D1, the second region having a linear portion extending from the surface to a depth of up to about 5 μm, the linear portion having a slope m2, wherein 200 MPa/μm≥|m2|≥30 MPa/μm.

According to aspect 51 of the disclosure, the method of aspect 50 is provided wherein 0.08 t≤DOC≤0.22 t.

According to aspect 52 of the disclosure, the method of aspect 51 is provided wherein 0.1 t≤DOC≤0.20 t.

According to aspect 53 of the disclosure, the method of any of aspects 46 to 52 is provided wherein the compressive layer has a compressive stress CS at the surface, and wherein 500 MPa≤CS≤950 MPa.

According to aspect 54 of the disclosure, the method of any of aspects 46 to 53 is provided wherein the glass article is non-frangible.

These and other aspects, advantages, and salient features will become apparent from the following detailed description, the accompanying drawings, and the appended claims.

BRIEF DESCRIPTION OF THE DRAWINGS

FIG. 9 is a representation of a non-frangible sample after a frangibility test.

FIG. 10 is a representation of a frangible sample after a frangibility test.

DETAILED DESCRIPTION

Figure 1:
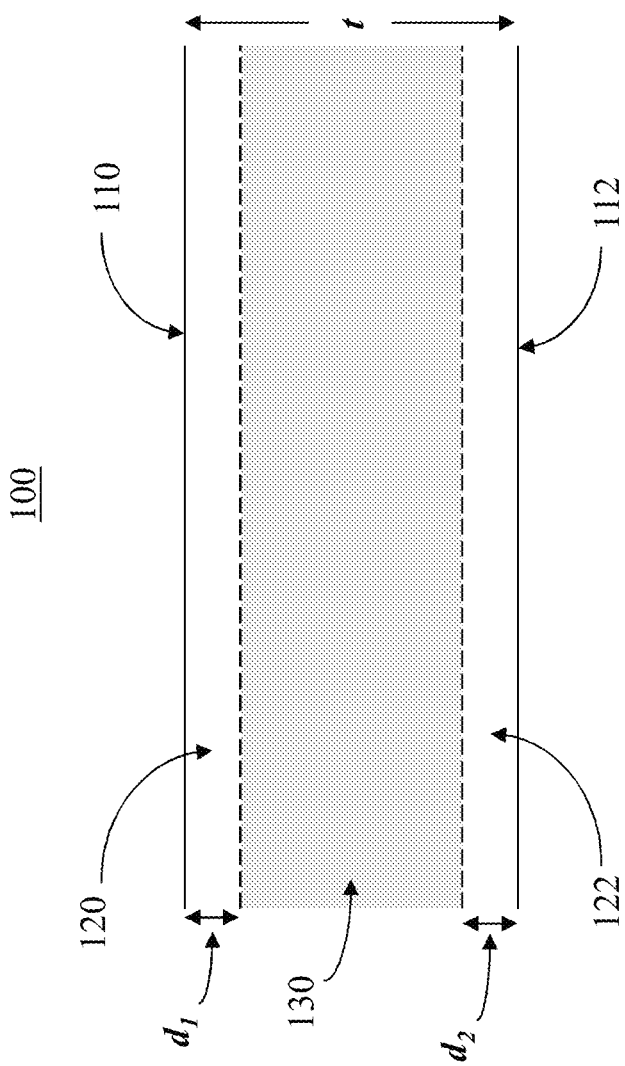
FIG. 1 is a cross-sectional schematic view of an ion exchanged glass article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "glass article" and "glass articles" are used in their broadest sense to include any object made wholly or partly of glass. Unless otherwise specified, all glass compositions are expressed in terms of mole percent (mol %) and all ion exchange bath compositions are expressed in terms of weight percent (wt %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of $Li_2O$," for example, is one in which $Li_2O$ is not actively added or batched into the glass, but may be present in very small amounts as a contaminant; i.e., less than 0.1 mol %. "Free of $Li_2O$" means that the glass contains 0 mol % $Li_2O$.

As used herein, the terms "depth of layer" and "DOL" refer to the depth of the compressive layer as determined by surface stress meter (FSM) measurements using commercially available instruments such as the FSM-6000 stress meter or the like.

As used herein, the terms "depth of compression" and "DOC" refer to the depth at which the stress within the glass changes from compressive to tensile stress. At the DOC, the stress crosses from a positive (compressive) stress to a negative (tensile) stress and thus has a value of zero. The depth of compression DOC and stress profile are determined from the spectra of bound optical modes for TM and TE polarization by using the inverse Wentzel-Kramers-Brillouin (IWKB) method, which is described in U.S. Pat. No. 9,140, 543, entitled "Systems And Methods for Measuring the Stress Profile of Ion-Exchanged Glass (hereinafter referred to as "Roussev I")," filed by Rostislav V. Roussev et al. on May 3, 2012, and claiming priority to U.S. Provisional Patent Application No. 61/489,800, having the same title and filed on May 25, 2011. The contents of the above patent applications are incorporated herein by reference in their entirety. Other methods known in the art, including, but not limited to, refractive near filed (RNF), polarimetric (e.g., scattering linear polarimetry (SCALP)), and etching and polishing techniques may be used to determine DOC and the stress profile of the strengthened glass article.

As use herein, the terms "physical central tension" and "physical CT" refer to the tensile stress at the center or midpoint (i.e., t/2, where t is the thickness of the glass article) of the glass article.

As described herein, compressive stress (CS) and central tension or physical center tension (CT) are expressed in terms of megaPascals (MPa), depth of layer (DOL) and depth of compression (DOC) are expressed in terms of microns (μm), where 1 μm=0.001 mm, and thickness t is expressed herein in terms of millimeters, where 1 mm=1,000 μm, unless otherwise specified.

According to the scientific convention normally used in the art, compression is expressed as a negative (<0) stress and tension is expressed as a positive (>0) stress. Throughout the instant description, however, compressive stress CS is expressed as a positive or absolute value—i.e., as recited herein, CS=|CS| and central tension or tensile stress is expressed as a negative value in order to better visualize the compressive stress profiles described herein.

As used herein, the "slope (m)" refers to the slope of a segment or portion of the stress profile that closely approximates a straight line. The predominant slope is defined as the average slope for regions that are well approximated as straight segments. These are regions in which the absolute value of the second derivative of the stress profile is smaller than the ratio of the absolute value of the first derivative at approximately half the depth of the region. For a steep, shallow segment of the stress profile near the surface of the strengthened glass article, for example, the essentially straight segment is the portion for each point of which the absolute value of the second derivative of the stress profile is smaller than the absolute value of the local slope of the stress profile divided by the depth at which the absolute value of the stress changes by a factor of 2. Similarly, for a segment of the profile deeper within the glass, the straight portion of the segment is the region for which the local second derivative of the stress profile has an absolute value that is smaller than the absolute value of the local slope of the stress profile divided by half the DOC.

For typical stress profiles, this limit on the second derivative guarantees that the slope changes relatively slowly with depth, and is therefore reasonably well defined and can be used to define regions of slope that are important for the stress profiles that are considered advantageous for drop performance.

Let the stress profile as a function of depth "x" be given by the function $$\sigma = \sigma(x) \qquad (1)$$

and let the first derivative of the stress profile with respect to depth be $$\sigma' = \frac{d\sigma}{dx}, \qquad (2)$$

and the second derivative be $$\sigma'' = \frac{d^2\sigma}{dx^2}. \qquad (3)$$

If a shallow segment extends approximately to a depth $d_s$, then for the purposes of defining a predominant slope, a straight portion of the profile is a region where $$|\sigma''(x)| < \left|2\frac{\sigma'(x)}{d_s}\right|. \qquad (4)$$

If a deep segment extends approximately to a larger depth DOC, or to a larger depth $d_d$, or to a depth DOL in traditional terms, then a straight portion of the profile is a region where $$|\sigma''(x)| < \left|2\frac{\sigma'(x)}{d_d}\right| \approx \left|2\frac{\sigma'(x)}{DOC}\right| \approx \left|2\frac{\sigma'(x)}{DOL}\right|. \qquad (5)$$

The latter equation is also valid for a 1-segment stress profile obtained by a single ion exchange in a salt containing only a single alkali ion other than the ion being replaced in the glass for chemical strengthening.

Preferably, the straight segments are selected as regions where $$|\sigma''(x)| < \left|\frac{\sigma'(x)}{d}\right|, \qquad (6)$$

where d stands for the relevant depth for the region, shallow or deep.

The slope m of linear segments of the compressive stress profiles described herein are given as absolute values of the slope $$\frac{d\sigma}{dx} - \text{i.e.,}$$

m, as recited herein, is equal to $$\left|\frac{d\sigma}{dx}\right|.$$

More specifically, the slope m represents the absolute value of the slope of a profile for which the compressive stress generally decreases as a function of increasing depth.

Compressive stress CS and depth of layer DOL are stress profile parameters that have been used to enable quality control of chemical strengthening. Compressive stress CS provides an estimate of the surface compression, which correlates well with the amount of stress needed to cause a failure of a glass article, particularly when the glass is free of deep mechanical flaws. Depth of layer DOL is used as an approximate measure of the depth of penetration of the larger (strengthening) cation (e.g., $K^+$ during $K^+$ for $Na^+$ exchange), with larger DOL values correlating well with greater depths of the compression layer, protecting the glass by arresting deeper flaws, and preventing flaws from causing failure under conditions of relatively low externally applied stress.

Even with minor to moderate bending of a glass article, the bending moment induces a stress distribution that is generally linear with depth from the surface, having a maximum tensile stress on the outer side of bending, a maximum compressive stress on the inner side of the bending, and zero stress at the so-called neutral surface, which is usually in the interior. For tempered glass parts, this bending-induced constant-slope stress distribution is added to the tempering stress profile to result in the net stress profile in the presence of external (bending) stress.

The net stress profile in the presence of bending-induced stress within the glass article generally has a depth of compression DOC that differs from the stress profile without such bending. In particular, the depth of compression DOC is reduced on the outer side of the glass article during bending. If the stress profile has a relatively small stress slope at depths in the vicinity of and smaller than the DOC, the DOC can substantially decrease in the presence of bending. In the net stress profile, the tips of moderately deep flaws could be exposed to tension, while the same flaw tips would normally be arrested in the compression region of the stress profile without bending. These moderately deep flaws can thus grow and lead to fracture during bending.

As used herein, the terms "error function" and "Erf" refer to the function which is twice the integral of a normalized Gaussian function between 0 and $x/\sigma\sqrt{2}$, and the terms "complementary error function" and "Erfc" are equal to 1 minus the error function; i.e., $\text{Erfc}=1-\text{Erf}(x)$.

Frangible behavior refers to specific fracture behavior when a glass article is subjected to an impact or insult. As utilized herein, a glass is considered non-frangible when it exhibits at least one of the following in a test area as the result of a frangibility test: (1) four or less fragments with a largest dimension of at least 1 mm, and/or (2) the number of bifurcations is less than or equal to the number of crack branches. The fragments, bifurcations, and crack branches are counted based on any 2 inch by 2 inch square centered on the impact point. Thus a glass is considered non-frangible if it meets one or both of tests (1) and (2) for any 2 inch by 2 inch square centered on the impact point where the breakage is created according to the procedure described below. In a frangibility test, an impact probe is brought in to contact with the glass, with the depth to which the impact probe extends into the glass increasing in successive contact iterations. The step-wise increase in depth of the impact probe allows the flaw produced by the impact probe to reach the tension region while preventing the application of excessive external force that would prevent the accurate determination of the frangible behavior of the glass. In one embodiment, the depth of the impact probe in the glass may increase by about 5 µm in each iteration, with the impact probe being removed from contact with the glass between each iteration. The test area is any 2 inch by 2 inch square centered at the impact point. FIG. 9 depicts a non-frangible test result. As shown in FIG. 9, the test area is a square that is centered at the impact point 130, where the length of a side of the square a is 2 inches. The non-frangible sample shown in FIG. 9 includes three fragments 142, and two crack branches 140 and a single bifurcation 150. Thus, the non-frangible sample shown in FIG. 9 contains less than 4 fragments having a largest dimension of at least 1 mm and the number of bifurcations is less than or equal to the number of crack branches. As utilized herein, a crack branch originates at the impact point, and a fragment is considered to be within the test area if any part of the fragment extends into the test area. While coatings, adhesive layers, and the like may be used in conjunction with the strengthened glass articles described herein, such external restraints are not used in determining the frangibility or frangible behavior of the glass articles. In some embodiments, a film that does not impact the fracture behavior of the glass article may be applied to the glass article prior to the frangibility test to prevent the ejection of fragments from the glass article, increasing safety for the person performing the test.

A frangible sample is depicted in FIG. 10. The frangible sample includes 5 fragments 142 having a largest dimension of at least 1 mm. The sample depicted in FIG. 10 includes 2 crack branches 140 and 3 bifurcations 150, producing more bifurcations than crack branches. Thus, the sample depicted in FIG. 10 does not exhibit either four or less fragments or the number of bifurcations being less than or equal to the number of crack branches.

In the frangibility test described herein, the impact is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., depth of layer) into the region that is under central tension CT.

Accordingly, the chemically strengthened glasses described herein are "non-frangible"—i.e., they do not exhibit frangible behavior as described hereinabove when subjected to impact by a sharp object.

Described herein are glasses having a thickness t, wherein 0.1 mm≤t≤0.4 mm (100 µm≤t≤400 µm); such as 0.1 mm≤t<0.4 mm (100 µm≤t<400 µm); 0.1 mm≤t≤0.38 mm (100 µm≤t≤380 µm); 0.1 mm≤t≤0.35 mm (100 µm≤t≤350 µm); and any sub-ranges contained therein. The glasses are chemically strengthened, having a compressive layer extending from a surface of the glass article to a depth of compression DOC (also referred to herein as "DOC") and a tensile region extending from the depth of compression to a center region of the glass article. The tensile region is under a physical center tension CT (also referred to herein as "physical CT"), wherein CT>|−1.956×10$^{−16}$×t$^{6}$+1.24274× 10$^{−12}$×t$^{5}$−3.09196×10$^{−9}$×t$^{4}$+3.80391×10$^{−6}$×t$^{3}$−2.35207× 10$^{−3}$×t$^{2}$+5.96241×10$^{−1}$×t+36.5994|, where t is expressed in microns. The glasses do not exhibit undesirable behavior, such as frangibility, when subjected to a sharp, fracture-inducing impact; i.e., the glasses are non-frangible.

A cross-sectional schematic view of an ion exchanged glass article is shown in FIG. 1. Glass article 100 has a thickness t, first surface 110, and second surface 112. Glass article 100, in some embodiments, has a thickness t of up to about 1 mm. While the embodiment shown in FIG. 1 depicts glass article 100 as a flat planar sheet or plate, glass article may have other configurations, such as three dimensional shapes or non-planar configurations. Glass article 100 has a first compressive layer 120 extending from first surface 110 to a depth of compression (DOC) $d_1$ into the bulk of the glass article 100. In the embodiment shown in FIG. 1, glass article 100 also has a second compressive layer 122 extending from second surface 112 to a second depth of compression $d_2$. First and second compressive layers 120, 122 are each under a compressive stress CS. In some embodiments, first and second compressive layers 120, 122 each have a maximum compressive stress at the first and second surfaces 110, 112, respectively. Glass article also has a central region 130 that extends from $d_1$ to $d_2$. Central region 130 is under a tensile stress or physical center tension (CT), which balances or counteracts the compressive stresses of layers 120 and 122. The depths of compression $d_1$, $d_2$ of first and second compressive layers 120, 122 protect the glass article 100 from the propagation of flaws introduced by sharp impact to first and second surfaces 110, 112 of glass article 100, while the compressive stress minimizes the likelihood of a flaw penetrating through the depth $d_1$, $d_2$ of first and second compressive layers 120, 122.

In some embodiments, the depth of compression "DOC" is greater than 0.05 t; such as at least 0.1 t; at least 0.15 t; and any sub-ranges contained therein. The depth of compression DOC, in some embodiments, has a maximum value of about 0.22 t (i.e., DOC≤0.22 t).

The glass, in some embodiments, is ion exchanged, and has a maximum compressive stress "CS1" in a range from about 200 MPa to about 950 MPa at the surface of the glass. In some embodiments, the compressive layer of the strengthened glass has a compressive stress profile i.e., the compressive stress varies as a function of depth beneath the surface of the glass. At least a portion of the compressive stress profile is linear, the linear portion having a slope "m1" wherein −200 MPa/μm≤m1≤−1 MPa/μm or, when expressed in terms of the absolute value of the slope "|m1|," 200 MPa/μm≥|m1|≥1 MPa/μm. In some embodiments, −20 MPa/μm≤m1≤−1.2 MPa/μm, or 20 MPa/μm≥|m1|≥1.2 MPa/μm; such as 20 MPa/μm≤m1≤−1.2 MPa/μm, or 20 MPa/μm≥|m1|≥1.2 MPa/μm; −15 MPa/μm≤m1≤−1.5 MPa/μm, or 15 MPa/μm≥|10|≥1.5 MPa/μm; and any sub-ranges contained therein.

The stress profile, in some embodiments, further includes a second region extending from the surface to a depth "D1." D1 is in a range from at least at least about 5 μm up to about 17 μm. In some embodiments, D1 is at least about 7 μm; such as at least about 9 μm. In some embodiments, D1 is less than or equal to about 15 μm; such as less than or equal to about 13 μm. The second region includes a linear portion extending from the surface to a depth of up to about 5 μm. The linear portion has a slope "m2," wherein −200 MPa/μm≤m2≤−30 MPa/μm or, expressed in terms of the absolute value of the slope "|m2|," 200 MPa/μm≥|m2|≥30 MPa/μm. In some embodiments, −160 MPa/μm≤m2≤−40 MPa/μm, or 160 MPa/μm≥|m2|≥40 MPa/μm; such as −120 MPa/μm≤m2≤−45 MPa/μm, or 120 MPa/μm≥|m2|≥45 MPa/μm; and any sub-ranges contained therein.

In some embodiments, the glass is strengthened by a single-step ion exchange (SIOX) process in which the glass is immersed in an ion exchange bath comprising from about 25 wt % to 100 wt % potassium nitrate (KNO$_3$) and from 0 wt % to about 75 wt % sodium nitrate (NaNO$_3$). The ion exchange is carried out at a temperature in a range from about 300° C. to about 500° C. Additional materials such as silicic acid may be added to the ion exchange bath to improve bath performance.

Figure 2:
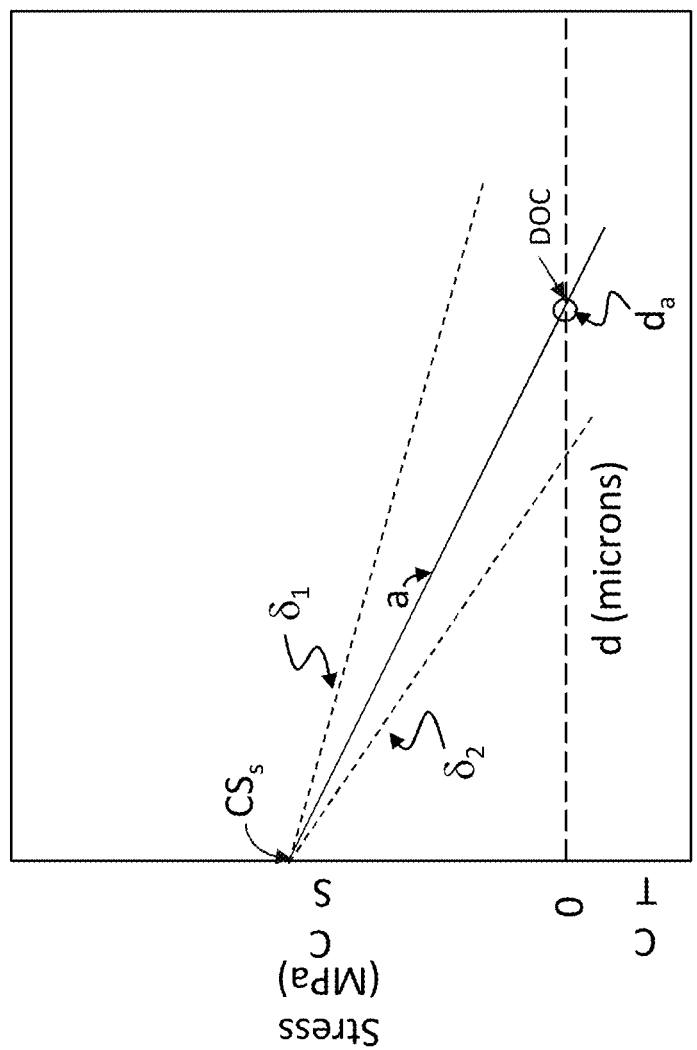
FIG. 2 is a schematic representation of a compressive stress profile obtained for a single ion exchange process.

In some embodiments, the compressive stress profile obtained via the SIOX process is substantially linear within the compression region, as schematically shown in FIG. 2, which is a plot of compressive stress (CS) as a function of depth within the glass. In FIG. 2, the compressive stress exhibits substantially linear behavior, resulting in a straight line compressive stress profile "a" having a slope "$m_a$," expressed in MPa/μm, that intercepts the vertical y-axis at "$CS_s$." CS profile a intercepts the x-axis at point "$d_a$," which is the depth of compression DOC. At this point, the total stress is zero. Below DOC, the glass article is in tension, reaching a central physical center tension approximately midway through the glass article—i.e., at about t/2.

In some embodiments, the compressive stress profile a of the glass article described herein has a slope $m_a$ following the SIOX step that is within a specified range. The slope $m_a$, in some embodiments, is taken as the ratio of the compressive stress at the surface CS to the depth of compression DOC (i.e., CS/DOC). In FIG. 2, for example, slope $m_a$ of line a lies between upper boundary $δ_2$ and lower boundary $δ_1$. As described herein, the slope $m_a$, upper boundary $δ_2$, and lower boundary $δ_1$ are expressed in terms of their absolute values; thus, $δ_2≥m_a≥δ_1$ is equivalent to $|δ_2|≥|m_a|≥|δ_1|$. In some embodiments, the single step ion exchange produces a compressive stress profile having a slope $m_a$ having an absolute value "$|m_a|$" in a range from 1 MPa/μm to about 200 MPa/μm (1 MPa/μm≤|$m_a$|≤200 MPa/μm; such as 2 MPa/μm≤|$m_a$|≤8 MPa/μm; 3 MPa/μm≤|$m_a$|≤6 MPa/μm; 2 MPa/μm≤|$m_a$|≤4.5 MPa/μm; and any sub-ranges contained therein. Alternatively, the slope $m_a$ may be expressed in terms of depth of layer (DOL) as determined by surface stress meter measurements, and calculated as the ratio of the compressive stress at the surface $CS_s$ to the DOL (i.e., $CS_s$/DOL). The absolute value |$m_a$| of the slope $m_a$ when expressed in terms of DOL is in a range from about 0.6 MPa/μm to about 200 MPa/μm; such as from about 0.6 MPa/μm to about 15 MPa/μm; from about 0.8 MPa/μm to about 10 MPa/μm; from about 1.5 MPa/μm to about 10 MPa/μm; and any sub-ranges contained therein.

In some embodiments, the glass is strengthened by a two-step ion exchange (DIOX) process. Here, the glass is first subjected to the SIOX process to achieve a deep depth of compression DOC or depth of layer DOL. The glass is then subjected to a second ion exchange in a bath comprising at least 95% KNO$_3$ by weight, in some embodiments, at least 97% KNO$_3$ by weight, and, in still other embodiments, 100% KNO$_3$ by weight. The second ion exchange step is typically carried out at temperatures ranging from about 370° C. to about 410° C. for times ranging from about 5 minutes to about 30 minutes. In a particular embodiment, the second ion exchange is carried out at about 390° C. for about 12 minutes. The depth of compression DOC following the DIOX process is in a range from about 0.05 t to about 0.22 t; such as from about 0.1 t to about 0.20 t; and any sub-ranges contained therein.

Figure 3:
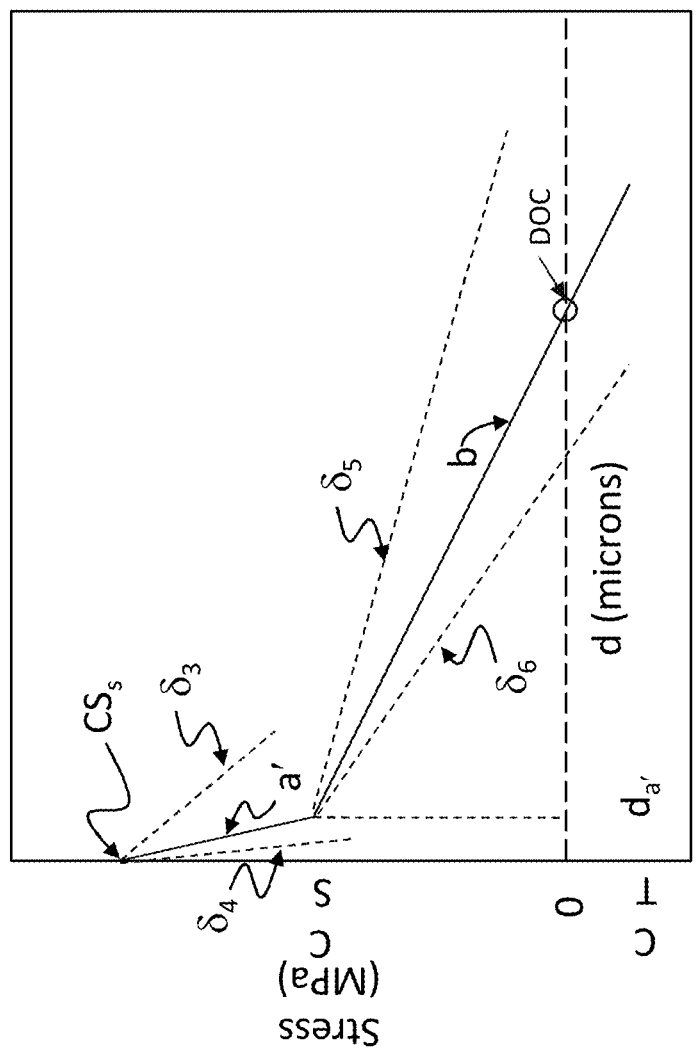
FIG. 3 is a schematic representation of a compressive stress profile obtained for a double ion exchange process.

The compressive stress profile resulting from the DIOX process is a combination of more than one substantially linear function, as schematically shown in FIG. 3. As seen in FIG. 3, the compressive stress profile has a first segment or portion "a'" and a second segment or portion "b." At least part of first portion a' exhibits substantially linear behavior from the strengthened surface of the glass article to a depth "$d_{a'}$." Portion a' has a slope "$m_{a'}$," and y-intercept "CS" which is the compressive stress at the surface of the glass. In some embodiments, depth $d_{a'}$ is in a range from about 10 µm to about 13 µm. The second portion b of the compressive stress profile is the result of the first ion exchange, or SIOX, step and extends from approximately depth $d_{a'}$ to the depth of compression DOC, and has a slope "$m_b$." Following the second ion exchange experiment, the slope $m_b$ of the SIOX portion of the profile, expressed in terms of the absolute value of $m_b$ "$|m_b|$" is in a range from about 1 MPa/µm to about 30 MPa/µm; such as from about 1.2 MPa/µm to about 20 MPa/µm; from about 1.5 MPa/µm to about 15 MPa/µm; and any sub-ranges contained therein. The slope $m_{a'}$ of the DIOX portion of the profile, expressed in terms of the absolute value of $m_{a'}$ (i.e., $|m_{a'}|$) is in a range from about 30 MPa/µm to about 200 MPa/µm; such as from about 40 MPa/µm to about 160 MPa/µm; from about 45 MPa/µm to about 120 MPa/µm; and any sub-ranges contained therein. Alternatively, the slope $m_{a'}$ of the DIOX portion of the stress profile may be expressed in terms of depth of layer (DOL) as determined by surface stress meter measurements, and calculated as the ratio of the compressive stress at the surface $CS_s$ to the depth of layer DOL (i.e., $CS_s$/DOL). The slope $m_{a'}$ of the DIOX portion of the stress profile expressed in terms of DOL is in a range from about 40 MPa/µm to about 200 MPa/µm; such as from about 40 MPa/µm to about 160 MPa/µm; from about 45 MPa/µm to about 120 MPa/µm; and any sub-ranges contained therein.

The compressive stress at depth $d_{a'}$, "$CS(d_{a'})$" is given by the expression $$CS(d_{a'}) = CS_s - d_{a'}(m_{a'}) \quad (7).$$

In non-limiting examples, the physical center tension "CT" is about 200 MPa, when the thickness "t" is about 100 µm; the physical CT is about 135 MPa when the thickness is 200 µm; and the physical CT is about 96.7 MPa when the thickness is 300 µm.

In some embodiments, the DOC is in a range from 0.05 t to about 0.22 t (0.05·t≤DOC≤0.22·t), where t is the thickness of the glass.

The compressive layer has a maximum compressive stress $CS_s$ in a range from about 200 MPa to about 950 MPa (200 MPa≤CS≤950 MPa) at the surface of the glass; such as from about 500 MPa to about 950 MPa (500 MPa≤CS≤950 MPa); and any sub-ranges contained therein.

The glasses described herein are ion exchangeable alkali aluminosilicate glasses, which, in some embodiments, are formable by down-draw processes, such as slot-draw or fusion-draw processes, that are known in the art. In particular embodiments, such glasses may have a liquidus viscosity of at least about 100 kiloPoise (kP); such as at least about 130 kP. In one embodiment, the alkali aluminosilicate glass comprises $SiO_2$, $Al_2O_3$, $P_2O_5$, and at least one alkali metal oxide ($R_2O$), wherein $0.75 \leq [(P_2O_5 \text{ (mol \%)} + R_2O \text{ (mol \%)})/M_2O_3 \text{ (mol \%)}] \leq 1.2$, where $M_2O_3 = Al_2O_3 + B_2O_3$. In some embodiments, the alkali aluminosilicate glass comprises or consists essentially of: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$ and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. In some embodiments, 11 mol % ≤ $M_2O_3$ ≤ 30 mol %; in some embodiments, 13 mol % ≤ $R_xO$ ≤ 30 mol %, where $R_xO$ is the sum of alkali metal oxides, alkaline earth metal oxides, and transition metal monoxides present in the glass; and in still other embodiments, the glass is lithium-free. These glasses are described in U.S. Pat. No. 9,346,703, entitled "Ion Exchangeable Glass with Deep Compressive Layer and High Damage Threshold," filed Nov. 28, 2011, by Dana Craig Bookbinder et al. and claiming priority from U.S. Provisional Patent Application No. 61/417,941, filed on Nov. 30, 2010, and having the same title, the contents of which are incorporated herein by reference in their entirety.

In certain embodiments, the alkali aluminosilicate glass comprises at least about 4 mol % $P_2O_5$, wherein ($M_2O_3$ (mol %)/$R_xO$(mol %))<1, $M_2O_3 = Al_2O_3 + B_2O_3$, and $R_xO$ is the alkali metal oxides, alkaline earth metal oxides, and transition metal monoxides present in the glass. In some embodiments, the alkali metal oxides, alkaline earth metal oxides, and transition metal monoxides are selected from the group consisting of $Li_2O$, $Na_2O$, $K_2O$, $Rb_2O$, $Cs_2O$, MgO, CaO, SrO, BaO, and ZnO. In some embodiments, the glass is lithium-free and consists essentially of from about 40 mol % to about 70 mol % $SiO_2$; from about 11 mol % to about 25 mol % $Al_2O_3$; from about 4 mol % to about 15 mol % $P_2O_5$; from about 13 mol % to about 25 mol % $Na_2O$; from about 13 to about 30 mol % $R_xO$, where $R_xO$ is the sum of the alkali metal oxides, alkaline earth metal oxides, and transition metal monoxides present in the glass; from about 11 to about 30 mol % $M_2O_3$, where $M_2O_3 = Al_2O_3 + B_2O_3$; from 0 mol % to about 1 mol % $K_2O$; from 0 mol % to about 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; and where $1.3 < [(P_2O_5 + R_2O)/M_2O_3] \leq 2.3$, where $R_2O$ is the sum of monovalent cation oxides present in the glass. In some embodiments, the glass is lithium-free. The glass is described in U.S. Pat. No. 9,156,724 by Timothy M. Gross, entitled "Ion Exchangeable Glass with High Crack Initiation Threshold," filed Nov. 15, 2012, and U.S. Pat. No. 9,765,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of the above patent and applications are incorporated herein by reference in their entirety.

The shape and values of the stress profile in an ion exchanged glass were previously thought to be limited by the center tension limit i.e., the center tension above which frangible behavior was expected to be observed when the glass suffered an impact sufficient to penetrate the compressive surface layer. This limit is was usually expressed in terms of the center tension CT, the value of the tensile stress in the center of the glass at the position where x=t/2. This center tension occurs naturally due to the force balance of the compressive stress induced in the sample during the ion exchange process. The integral or sum of the stress at each point in the compressive portion of the stress profile must equal the integral or sum of the stress at each point in the tensile portion of the profile, so that the glass article is not curved or warped by the ion exchange process.

Figure 4:
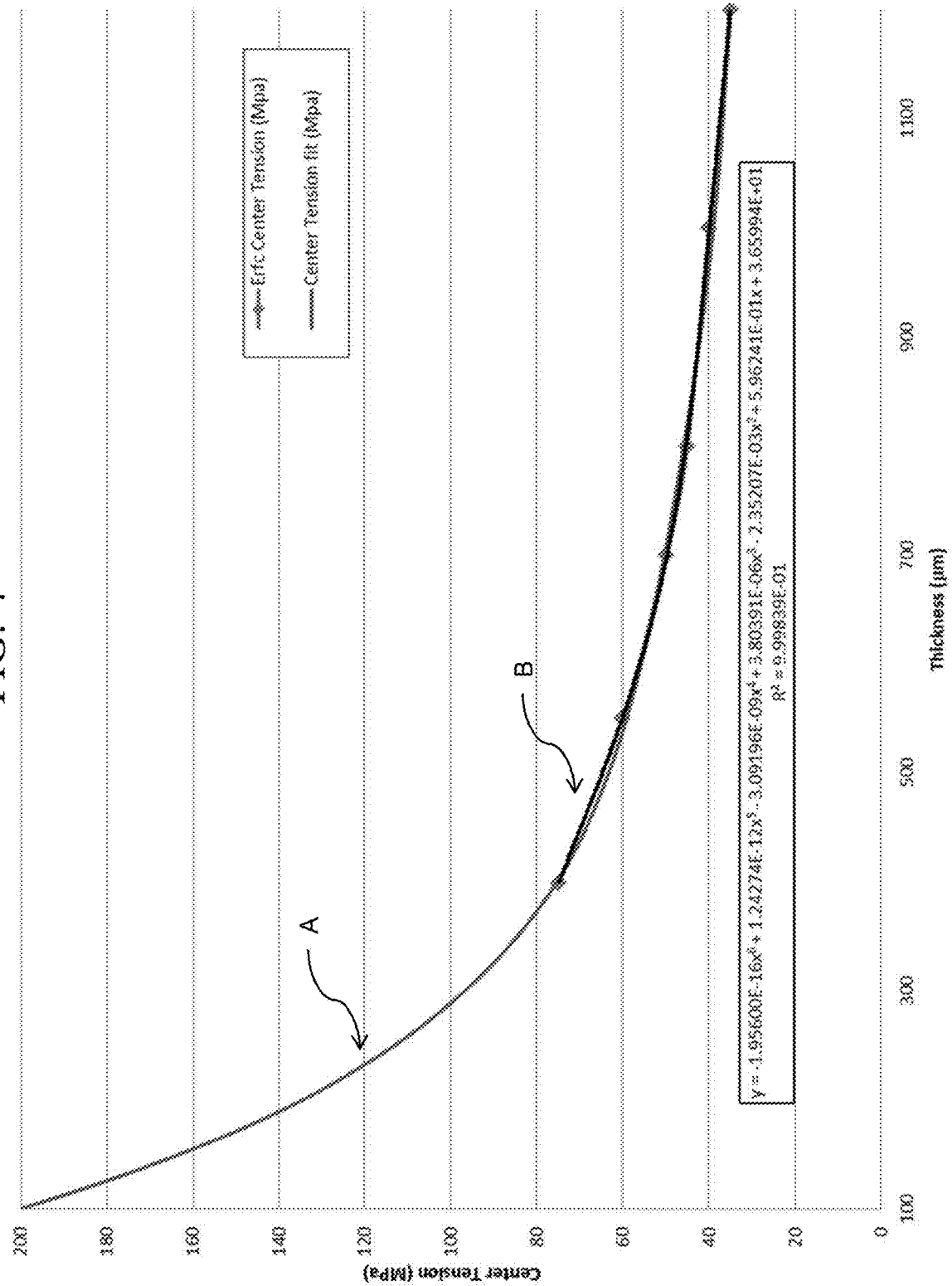
FIG. 4 is a plot the physical center tension as a function of the sample thickness for a single ion exchange process.

It is assumed that in the stress profile obtained by the single ion exchange process, ion diffusion is guided by a classical complementary error function. It was experimentally shown that this limits the physical center tension CT limit, and that the CT limit varied with thickness, as shown in FIG. 4, which is a plot of the physical center tension CT limit as a function of glass thickness. In FIG. 4, the center tension limit data are given for single ion exchange (SIOX) and follow an approximated complementary error function (erfc) shape (line B). The CT limit is given by the expression $$CT = -1.956 \times 10^{-16} \cdot t^6 + 1.24274 \times 10^{-12} \cdot t^5 - 3.09196 \times 10^{-9} \cdot t^4 + 3.80391 \times 10^{-6} \cdot t^3 - 2.35207 \times 10^{-3} \cdot t^2 + 5.96241 \times 10^{-1} \cdot t + 36.5994 \quad (8),$$

where t is expressed in microns.

A curve (line A in FIG. 4) may be used to determine other physical center tension limit values for glass thicknesses ranging from 100 µm to 1,200 µm. Based on curve A, the physical CT limit for an ion exchanged glass article having a thickness of 300 µm is approximately 97 MPa; for 200 µm glass thickness, the CT limit is approximately 135 MPa; and for 100 µm glass thickness, the CT limit is approximately 200 MPa.

Figure 5:
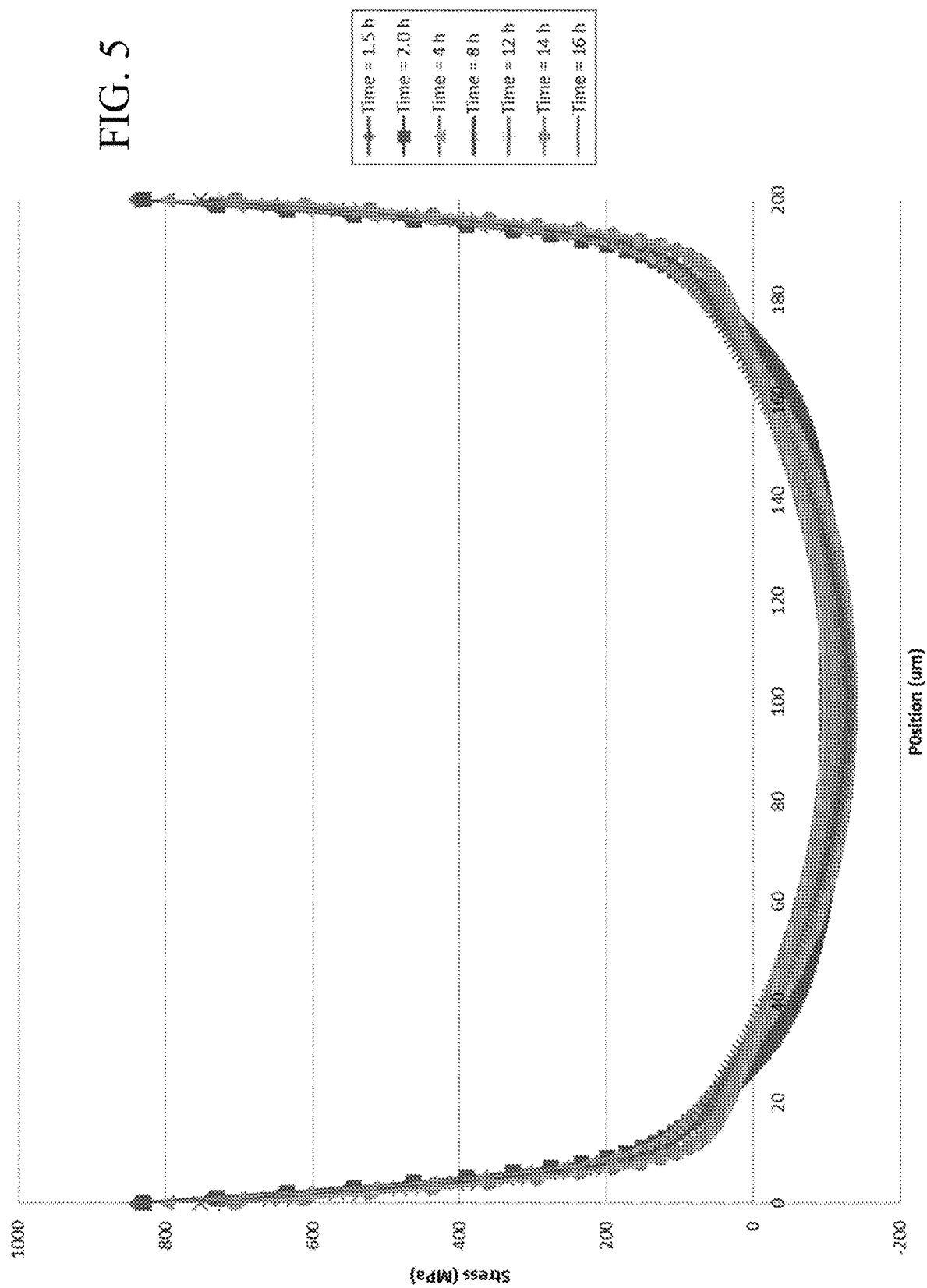
FIG. 5 is a plot of stress profiles generated in 200 μm glass samples by a double ion exchange process.
Figure 6:
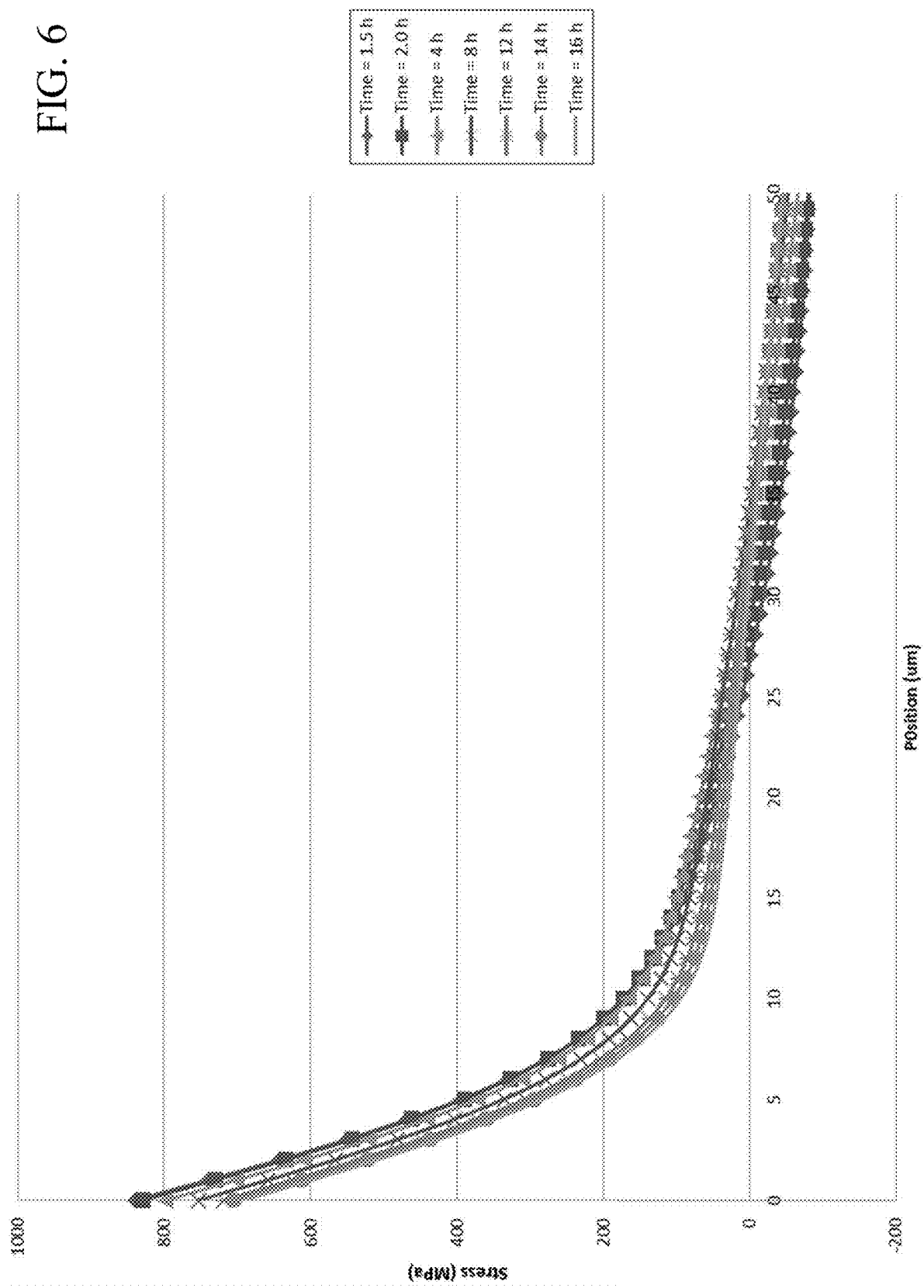
FIG. 6 is a is a detail of the stress profiles shown in FIG. 5.

Examples of stress profiles generated in glass samples having a thickness of 200 µm by a double ion exchange (DIOX) process are shown in FIG. 5. FIG. 6, shows a portion of FIG. 5 in more detail. The stress profiles were determined from the spectra of bound optical modes for TM and TE polarization by using the inverse Wentzel-Kramers-Brillouin (IWKB) method, previously described hereinabove. The first ion exchange step was carried out in a "poisoned" (i.e., comprising greater than 30 wt % $NaNO_3$) bath that is a mix of $NaNO_3$ and $KNO_3$. The second ion exchange step is carried out in an ion exchange bath containing mostly (i.e., ≥96 wt %) $KNO_3$ with little poisoning, creating a "spike" (i.e. a steep increase in compressive stress at the surface of the glass) in the stress profile. For the glass thicknesses (0.1-0.4 mm) described herein, ions diffusing into the glass from opposite surfaces may meet at the center t/2 of the glass in reasonably short ion exchange times. Before the diffusing ions reach the center t/2, the stress profile produced by the first ion exchange step takes the form of a complementary error-function (Erfc). After the diffusing ions reach the center of the glass, the overall stress profile obtained by the first ion exchange step resembles a parabolic function. The spike creates a change in the slope of the stress profile, leading to a higher compressive stress at the surface. The depth of compression (DOC) is the point where the compressive stress is zero (i.e., the point at which the stress transitions from compressive to tensile stress). The center tension is the value of the stress in the center or midpoint between the opposing major surfaces of the glass (i.e., t/2).

A series of experiments were conducted on ion exchanged glass having an initial thickness of 200 µm. The samples were first ion exchanged in a poisoned ion exchange bath (49 wt % $NaNO_3$/51 wt % $KNO_3$) at about 450° C. for 1.5 hours, 2 hours, 4 hours, 8 hours, 12 hours, 14 hours, and 16 hours, followed by ion exchange at about 390° C. for 12 min (0.2 hour) in a second bath of pure (100 wt %) $KNO_3$. None of these ion exchanged glass samples exhibited frangible behavior when impact tested, indicating that that there is a region where ions from the ion exchange bath may diffuse for any period of time without resulting in frangible behavior of the glass. This may be attributed to the level of poisoning of the ion exchange bath (or baths) that is used to obtain the compressive stress spike. This minimum level of poisoning should correlate with or correspond to the maximum allowable CT for a given thickness as described in FIG. 5. When the ion exchange bath poisoning exceeds the minimum level, the physical central tension CT for the glasses described herein may exceed the CT limit (i.e., CT exceeds the frangibility limit given in equation (8)) without exhibiting frangible behavior. Thus, the lower limit of the maximum physical tension CT in the glass may be given by the expression:

$$CT > |-1.956 \times 10^{-16} \cdot t^6 + 1.24274 \times 10^{-12} \cdot t^5 - 3.09196 \times 10^{-9} \cdot t^4 + 3.80391 \times 10^{-6} \cdot t^3 - 2.35207 \times 10^{-3} \cdot t^2 + 5.96241 \times 10^{-1} \cdot t + 36.5994| \quad (9),$$

where t is expressed in microns.

Figure 7:
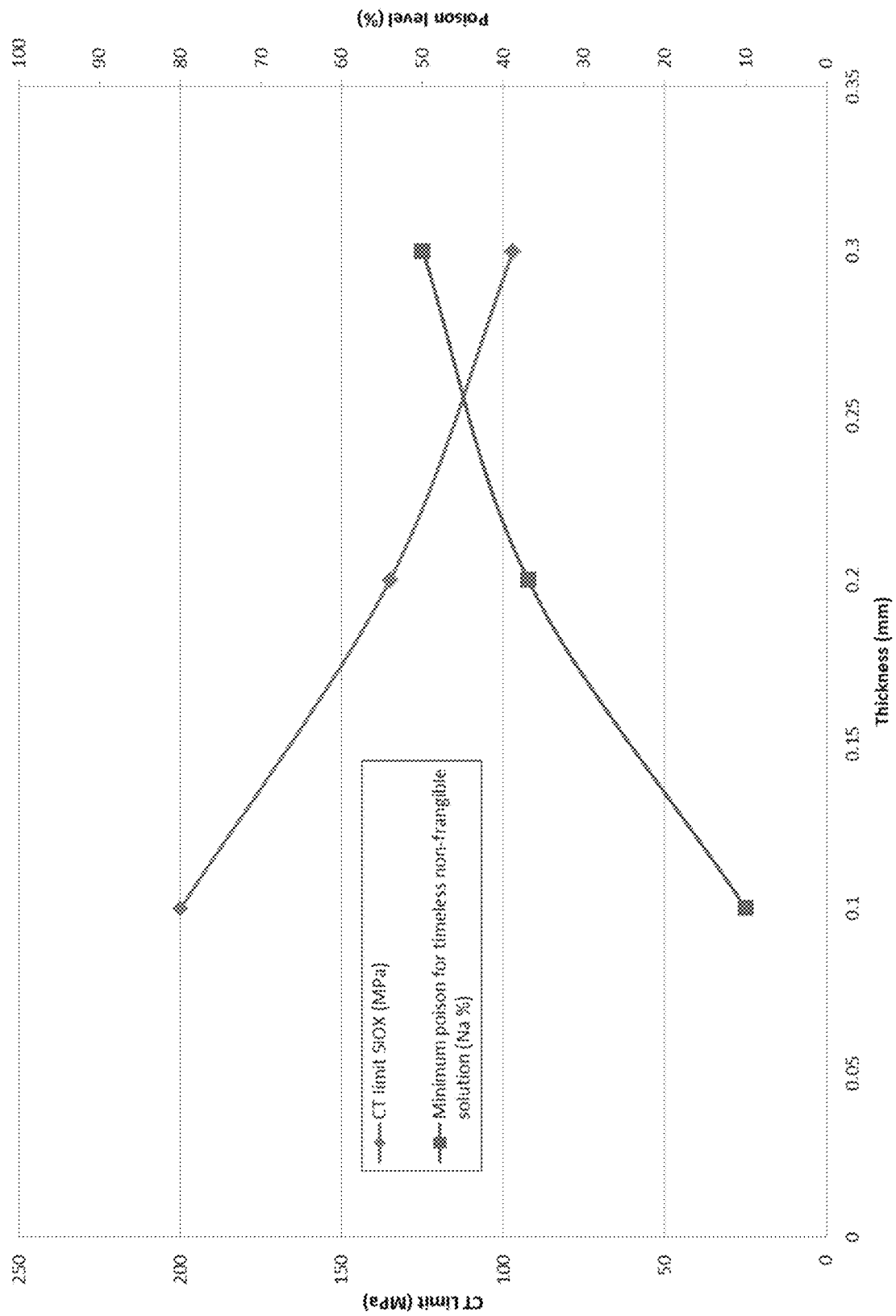
FIG. 7 is a plot of the physical center tension (CT) limit and minimum level of $NaNO_3$ poisoning of the ion exchange bath as functions of glass thickness for a single ion exchange process.

The level of ion exchange bath poisoning required to reach a condition in which ions may diffuse indefinitely without producing frangible behavior has been estimated and experimentally confirmed. FIG. 7 is a plot of the CT limit (line A) and minimum level of $NaNO_3$ poisoning (line B) of the ion exchange bath as functions of glass thickness for a single ion exchange (SIOX) process. At poisoning levels above line B, ions can diffuse indefinitely without producing frangible behavior.

Figure 8:
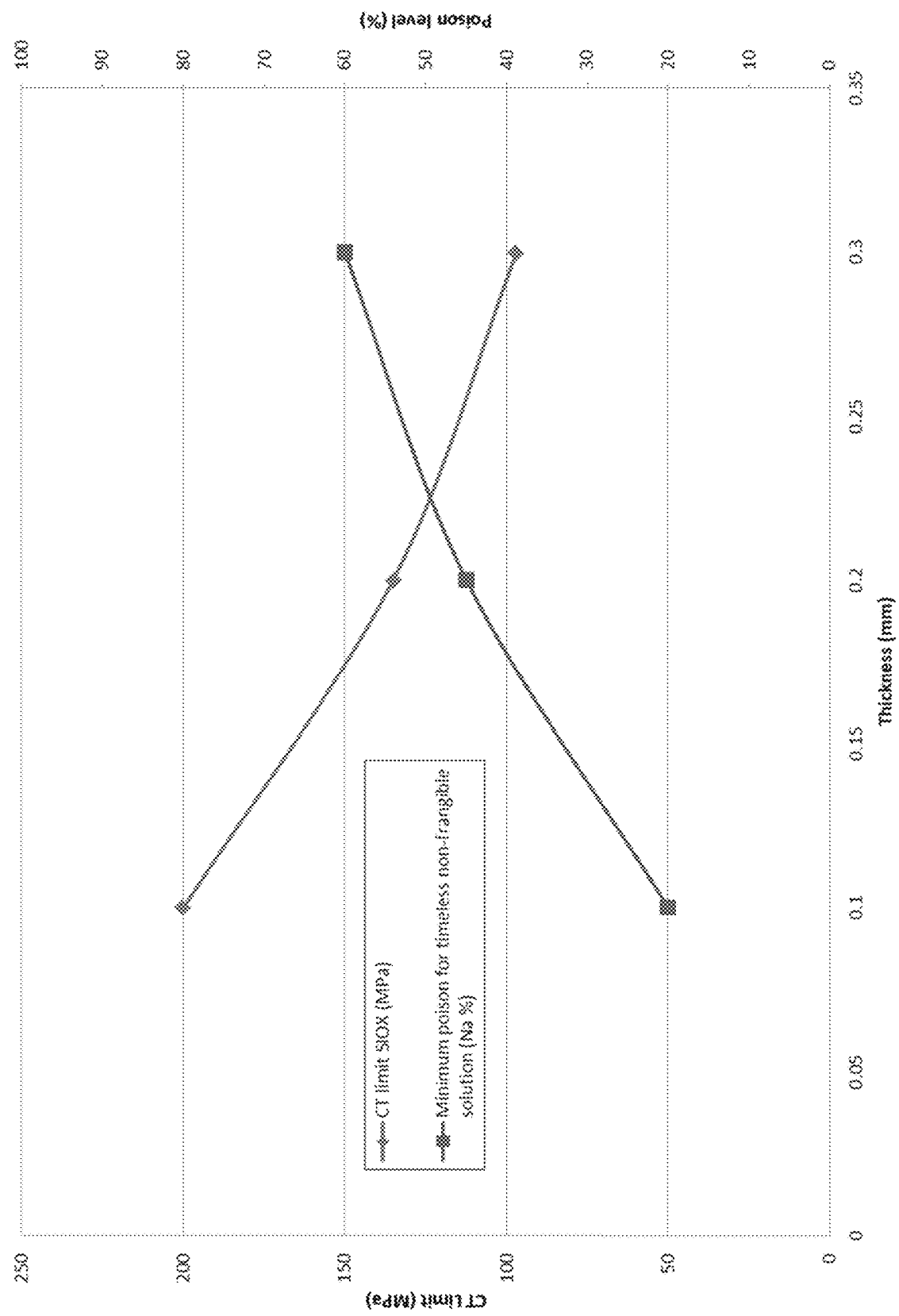
FIG. 8 is a plot of the physical center tension (CT) limit and minimum level of $NaNO_3$ poisoning of the ion exchange bath as functions of glass thickness for a double ion exchange process.

When the glass is subjected to a second ion exchange to provide a sharp increase or "spike" in compressive stress at the surface of the glass, the minimum bath poisoning levels at which indefinite diffusion of ions without producing frangibility will shift. The CT limit (line A) and minimum level of $NaNO_3$ poisoning (line B) of the ion exchange bath as functions of glass thickness are plotted for a two-step or double ion exchange (DIOX) process in FIG. 8. As with single-step ion exchange (FIG. 2), ions may diffuse indefinitely without achieving frangibility when poisoning levels exceed the lower limit of line B. With two-step ion exchange, the ion diffusion resulting from ion exchange in a bath of 100 wt % $KNO_3$ for 12 minutes at 390° C. induces additional stress in the sample, which shifts the minimum poisoning limit in order to compensate for the additional stress induced in the sample. The two-step ion exchange process increases the minimum poisoning level needed to achieve the diffusion effect described above by about 10%.

The shape of the stress profile, depth of compressive layer DOL, physical center tension CT, and the threshold for frangible behavior for glasses with substantially nonlinear diffusion may be obtained from an empirical model, summarized in Table 1. Based on modeling, frangible behavior is expected in an alkali aluminosilicate glass having a thickness of 200 µm (0.2 mm) when the glass is subjected to single ion exchange in a molten salt bath of essentially pure $KNO_3$ to achieve a depth of layer DOL of about 27 µm, a maximum compressive stress CS at the surface of about 820 MPa, and a physical CT of about 107±5 MPa. The depth of compression DOC of this glass is estimated to be about 21.5 µm. While the high CS is desirable for strength in applications such as of thin glass covers, the low depth of compression DOC of 21.5 µm is a concern for fracture caused by flaw introduction. In another example, the CS is reduced, the DOL is increased by ion exchange (SIOX) in a single bath containing about 5 wt % $NaNO_3$ with the balance being essentially $KNO_3$. The onset of frangible behavior now occurs at a DOL of about 36.5 µm, with a CS of about 610 MPa, a DOC of about 26.8 µm, and a physical CT of about 113±5 MPa. In another example, in an ion exchange mixture having about 10 wt % $NaNO_3$ with the balance being essentially KNO$_3$, the frangible behavior is approached when the DOL is about 47 μm, the CS is about 490 MPa, the DOC is about 31.5 μm, and the physical CT is about 120±5 MPa. The DOC is almost 50% greater than that of a sample prepared in a pure KNO$_3$ bath, and may provide substantially better protection against flaw introduction, and may therefore be preferred in applications where the glass is less protected against flaw introduction by the overall system design.

TABLE 1

Summary of properties calculated for ion exchanged alkali aluminosilicate glass having a thickness of 200 μm (0.2 mm).

| Bath | CS (MPa) | DOL (μm) | DOC (μm) | CT (MPa) |
|---|---|---|---|---|
| SIOX 100 wt % KNO$_3$ | 820 | 27 | 21.5 | 107 ± 5 |
| SIOX 5 wt % NaNO$_3$ | 610 | 36.5 | 26.8 | 113 ± 5 |
| SIOX 10 wt % NaNO$_3$ | 490 | 47 | 31.5 | 120 ± 5 |

In one example of the empirical model, an alkali aluminosilicate glass having a nominal composition of about 57 mol % SiO$_2$, 0 mol % B$_2$O$_3$, about 17 mol % Al$_2$O$_3$, about 7% P$_2$O$_5$, about 17 mol % Na$_2$O, about 0.02 mol % K$_2$O, and about 3 mol % MgO and a thickness of 200 μm is subjected to a two-step ion exchange process. A first ion exchange is performed at about 450° C. for about 5.5 hours in a molten ion exchange bath containing about 51 wt % KNO$_3$ and about 49 wt % NaNO$_3$, resulting in a compressive stress at the largest DOL of about 87 μm, and a physical CT of up to about 114 MPa. The depth of layer DOL following the first ion exchange step is in a range from about 0.3t to about 0.44t, where t is the thickness. The glass is then subjected to a second ion exchange step in a bath containing about 0.5 wt % NaNO$_3$ and about 99.5 wt % KNO$_3$ for 15 minutes at 390° C. Following the second ion exchange step, the CS is about 796 MPa at the surface, and the shallow, steep "spike" region produced by the second ion exchange step extended from the surface of the glass to a depth of about 12-13 μm. The physical CT after the second step is about 154 MPa and is estimated to be near the onset of frangibility in this regime of deep ion exchange with a sharp CS spike at the surface. The depth of compression is about 44 μm before the addition of the spike in the second ion exchange step, and about 34.5 μm after the spike. The slope of the deep (i.e., the segment of the stress profile extending from a depth of about 13 μm to the DOL or DOC) portion of the profile within the compression region is about 4.5 MPa/μm. In this example the DOL is about 0.435t, where t is the thickness of the glass, and the K$^+$ concentration profiles from the two ends of the substrate barely reach the center of the glass (t/2). In some embodiments, the absolute value of the slope of the deep portion of the compression region is a range from about 2 MPa/μm to about 15 MPa/μm.

In another example of the empirical model, an alkali aluminosilicate glass having a nominal composition of about 57 mol % SiO$_2$, 0 mol % B$_2$O$_3$, about 17 mol % Al$_2$O$_3$, about 7% P$_2$O$_5$, about 17 mol % Na$_2$O, about 0.02 mol % K$_2$O, and about 3 mol % MgO and a thickness of 200 μm is subjected to a two-step ion exchange process. A first ion exchange is performed at about 450° C. for about 4.8 hours in a molten ion exchange bath containing about 57 wt % KNO$_3$ and about 43 wt % NaNO$_3$. After the first ion exchange step, the maximum compressive stress at the surface of the glass was 218 MPa, the depth of layer DOL was about 87 μm, and the physical CT was about 129 MPa. Following the first ion exchange step, the DOL is preferably in a range from about 0.3t to about 0.44t. A second ion exchange step was performed for 12 minutes at 390° C. in a bath containing about 2.5 wt % NaNO$_3$ and about 95 wt % KNO$_3$. The CS after the second step is about 720 MPa, and the shallow, steep "spike" region produced by the second step extended from the surface of the glass to a depth of about 11 μm. The physical CT after the second step is about 158 MPa, and is estimated to be near the onset of frangibility in this regime of deep ion exchange with a sharp CS spike at the surface. The depth of compression DOC is about 44 μm before the addition of the spike in the second ion exchange step, and about 38 μm after formation of the spike. The absolute value of the slope of the deep portion of the profile within the compression region is about 5 MPa/μm. In this example the DOL is about 0.435t, and the K$^+$ concentration profiles from the two ends of the substrates barely reach the center of the thickness (t/2).

In another example of the empirical model, an alkali aluminosilicate glass having a thickness of 200 μm and nominal composition of about 57 mol % SiO$_2$, 0 mol % B$_2$O$_3$, about 17 mol % Al$_2$O$_3$, about 7% P$_2$O$_5$, about 17 mol % Na$_2$O, about 0.02 mol % K$_2$O, and about 3 mol % MgO is subjected to a two-step ion exchange process. A first ion exchange is performed at about 450° C. for about 4.25 hours in a molten ion exchange bath containing about 58 wt % KNO$_3$ and about 42 wt % NaNO$_3$. After the first ion exchange step, the maximum compressive stress at the surface of the glass was 229 MPa, the depth of layer DOL was about 82 μm, and the physical CT was about 123 MPa. A second ion exchange step was performed for 12 minutes at 390° C. in a bath containing about 2.5 wt % NaNO$_3$ and about 95 wt % KNO$_3$. The CS after the second step is about 730 MPa, and the shallow, steep "spike" region produced by the second step extended from the surface of the glass to a depth of about 11 μm. The physical CT after the second step is about 153 MPa, and is estimated to be near the onset of frangibility in this regime of deep ion exchange with a sharp CS spike at the surface. The depth of compression DOC is about 43 μm before the addition of the spike in the second ion exchange step, and about 37 μm after formation of the spike. The slope of the deep portion of the profile within the compression region is about 5.3 MPa/μm. In this particular embodiment, the depth of layer after the first step should be between about 0.3 t and about 0.43 t and, in some embodiments, between about 0.35 t and about 0.42 t.

The experimental physical center tension CT limits shown in FIG. 4 have been obtained for stress profiles generally having a ratio of DOC to thickness t of 0.15 or less. Based on observations of non-frangible and frangible samples having higher DOC/t ratios, the upper (i.e., frangibility) limit for the physical center tension as a function of thickness is greater when the depth of compression and stress profile are relatively deep, e.g., when DOC>0.12 t, and, in some embodiments, DOC>0.15 t. In order to be non-frangible, the physical center tension CT of the ion exchanged glasses described herein should not exceed this upper limit. In some embodiments, the upper physical CT limit "CT$^{upper}$" is given by the expression $$CT^{upper}(MPa) = (85/\sqrt{t(mm)}) \qquad (10),$$

and, in certain embodiments, $$CT^{upper}(MPa) = (79/\sqrt{t}(mm)) \quad (11).$$

The CT limit given in equation (11) is particularly recommended when the depth of compression DOC achieved by single (SIOX) or double (DIOX) ion exchange processes is less than about 0.22 t and greater than about 0.18 t (i.e., 0.18 t<DOC<0.22 t). For example, in order to avoid undesired behavior, such as frangible behavior, an ion exchanged 0.2 mm thick glass sample having a DOL of 87 µm and a DOC of 38 µm following the second step of the DIOX process should have a physical CT that is less than or equal to the $CT^{upper}$ value provided by equation (11). Equation (11) may also be used for stress profiles achieved by a SIOX process when the concentration of the ions from the ion exchange bath in the center of the substrate begins to increase measurably as a result of the ion exchange.

In those embodiments in which in which 0.16 t<DOC<0.19 t, the physical CT should not exceed a reduced upper limit:

$$CT^{upper}(MPa) = (73/\sqrt{t}(mm)) \quad (12),$$

which was imposed on a 0.2 mm thick example in which the DOL was about 82 µm and the DOC was about 37 µm after the second step of the DIOX process.

Figure 11B:
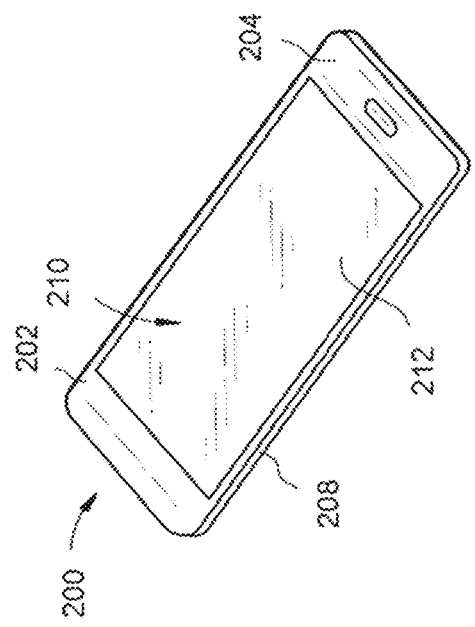
FIG. 11B is a perspective view of the exemplary electronic device of FIG. 11A.
Figure 11A:
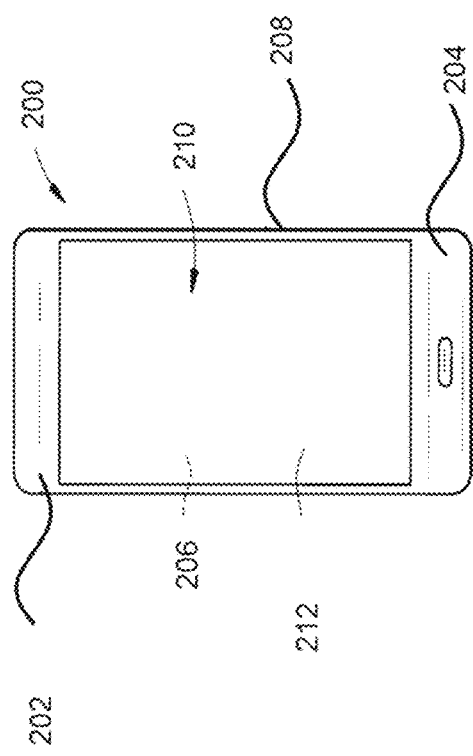
FIG. 11A is a plan view of an exemplary electronic device incorporating any of the strengthened articles disclosed herein.

The strengthened articles disclosed herein may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the strengthened articles disclosed herein is shown in FIGS. 11A and 11B. Specifically, FIGS. 11A and 11B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, the cover substrate 212 may include any of the strengthened articles disclosed herein.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article, the glass article having a thickness t, wherein 0.2 mm≤t<0.4 mm, a compressive layer extending from a surface of the glass article to a depth of compression DOC and a tensile region extending from the depth of compression to a center region of the glass article, the tensile region under a physical center tension CT, wherein CT>|−1.956×10$^{-16}$×t$^6$+1.24274×10$^{-12}$×t$^5$−3.09196×10$^{-9}$×t$^4$+3.80391×10$^{-6}$×t$^3$−2.35207×10$^{-3}$×t$^2$+5.96241×10$^{-1}$×t+36.59941, where t is expressed in microns, and where CT is expressed in MPa, the glass article (i) being non-frangible, (ii) lithium free, (iii) comprising an alkali aluminosilicate glass comprising 0% B$_2$O$_3$, and (iv) comprising a depth of layer (DOL) in a range from about 0.3t to about 0.44t.

2. The glass article of claim 1, wherein 0.05t≤DOC≤0.22t.

3. The glass article of claim 1, wherein the compressive layer has a compressive stress CS1 at the surface, and wherein 200 MPa≤CS1≤950 MPa.

4. The glass article of claim 1, wherein the glass article is ion exchanged.

5. The glass article of claim 1, wherein the compressive layer has a stress profile, wherein at least a portion of the stress profile is linear and has a slope m1, and wherein 200 MPa/µm≥|m1|≥MPa/µm.

6. The glass article of claim 5, wherein 20 MPa/µm≥|m1|≥1.2 MPa/µm.

7. The glass article of claim 1, wherein the compressive layer has a stress profile comprising: (i) a first region extending from at least a first depth D1 to the depth of compression DOC, wherein at least a portion of the first region is linear and has a slope m1, wherein 20 MPa/µm≥|m1|≥1.2 MPa/µm and where 9 µm≤D1≤17 µm; and (ii) a second region extending from the surface to a depth of up to the first depth D1, the second region having a linear portion extending from the surface to a depth of up to about 5 µm or less and having a slope m2, wherein 200 MPa/µm≥|m2|≥30 MPa/µm.

8. The glass article of claim 7, wherein 160 MPa/µm≥|m2|≥40 MPa/µm.

9. The glass article of claim 1, wherein the glass article comprises a concentration profile of K$^+$ that reaches a center of the glass article at t/2.

10. The glass article of claim 9, wherein the alkali aluminosilicate glass comprises P$_2$O$_5$.

11. The glass article of claim 1, wherein the physical center tension CT is less than or equal to about 200 MPa.

12. The glass article of claim 11, wherein the center tension CT is less than or equal to about 135 MPa.

13. The glass article of claim 1, wherein DOC>0.15t, wherein CT (MPa)≤(85/√t (mm)).

14. The glass article of claim 13, wherein 0.18t<DOC<0.22t, wherein CT (MPa)≤(79/√t (mm)).

15. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and
the glass article of claim 1 disposed over the display.

16. A glass article, the glass article being non-frangible and having a thickness t, wherein 0.1 mm≤t<0.4 mm, and the glass article comprising:
a. a compressive layer extending from a surface of the glass article to a depth of compression DOC, the compressive layer having a stress profile, the stress profile comprising:
i. a first region extending from at least a first depth D1 to the depth of compression DOC, wherein at least a portion of the first region is linear and has a slope m1, wherein 20 MPa/µm≥|m1|≥1.2 MPa/µm and where 9 µm≤D1≤17 µm; and
ii. a second region extending from the surface to a depth of up to the first depth D1, the second region having a linear portion extending from the surface to a depth of up to about 5 µm or less and having a slope m2, wherein 200 MPa/µm≥|m2|≥30 MPa/µm; and
b. a tensile region extending from the depth of compression to a center region of the glass article, the tensile region under a physical center tension CT, wherein $CT > |-1.956 \times 10^{-16} xt^6 + 1.24274 \times 10^{-12} xt^5 - 3.09196 \times 10^{-9} xt^4 + 3.80391 \times 10^{-6} xt^3 - 2.35207 \times 10^{-3} xt^2 + 5.96241 \times 10^{-1} xt + 36.59941$, where t is expressed in microns, and where CT is expressed in MPa; and c. comprising an alkali aluminosilicate glass comprising 0% $B_2O_3$ and a depth of layer (DOL) in a range from about 0.3t to about 0.44t.

17. The glass article of claim 16, wherein $0.08t \leq DOC \leq 0.22t$.

18. The glass article of claim 16, wherein the compressive layer has a compressive stress CS at the surface, and wherein 200 MPa $\leq$ CS $\leq$ 950 MPa.

19. The glass article of claim 16, wherein the glass article is ion exchanged.

20. The glass article of claim 16, wherein the glass article comprises a concentration profile of $K^+$ that reaches a center of the glass article at t/2.

21. The glass article of claim 20, wherein the glass is lithium-free.

22. The glass article of claim 20, wherein the alkali aluminosilicate glass comprises $P_2O_5$.

23. The glass article of claim 16, wherein the center tension CT is less than or equal to about 200 MPa.

24. The glass article of claim 16, wherein the center tension CT is in the range of 135 MPa to 200 MPa, and the thickness t is in the range of 100 μm to 200 μm.

25. The glass article of claim 16, wherein DOC>0.15t, wherein CT (MPa)$\leq$(85/$\sqrt{t}$ (mm)).

26. The glass article of claim 25, wherein 0.18t<DOC<0.22t, wherein CT (MPa)$\leq$(79/$\sqrt{t}$ (mm)).

27. The glass article of claim 16, wherein the center tension CT is in the range of 96.7 MPa to 200 MPa, and the thickness t is in the range of 100 μm to 300 μm.

28. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and
the glass article of claim 16 disposed over the display.

* * * * *

UNITED STATES PATENT AND TRADEMARK OFFICE
CERTIFICATE OF CORRECTION

PATENT NO. : 11,286,203 B2
APPLICATION NO. : 15/403817
DATED : March 29, 2022
INVENTOR(S) : Pascale Oram et al.

Page 1 of 1

It is certified that error appears in the above-identified patent and that said Letters Patent is hereby corrected as shown below:

On the Title Page

On the page 2, in Column 2, Item (56) under "U.S. Patent Documents", Line 10, delete "Lambright" and insert -- Lambricht --.

On the page 2, in Column 2, Item (56) under "U.S. Patent Documents", Line 11, delete "Lambright" and insert -- Lambricht --.

On the page 2, in Column 2, Item (56) under "Other Publications", Line 8, delete "Paten" and insert -- Patent --.

In the Claims

In Column 19, Line 58, in Claim 1, delete "DOC" and insert -- (DOC) --.

In Column 19, Line 63, in Claim 1, delete "36.59941," and insert -- 36.5994|, --.

In Column 19, Line 65, in Claim 1, delete "lithium free," and insert -- lithium-free, --.

In Column 20, Line 10, in Claim 5, delete "MPa/µm." and insert -- 1 MPa/µm. --.

In Column 20, Line 16, in Claim 7, delete "DOC," and insert -- (DOC), --.

In Column 20, Line 52, in Claim 16, delete "DOC," and insert -- (DOC), --.

In Column 20, Line 56, in Claim 16, delete "DOC," and insert -- (DOC), --.

In Column 21, Line 3, in Claim 16, delete "36.59941," and insert -- 36.5994|, --.

Signed and Sealed this
Twenty-seventh Day of September, 2022

Katherine Kelly Vidal
*Director of the United States Patent and Trademark Office*